J. J. CHAPIN.
STEERING MECHANISM FOR MOTOR CYCLES.
APPLICATION FILED AUG. 23, 1915.
1,184,321.
Patented May 23, 1916.
2 SHEETS—SHEET 1.
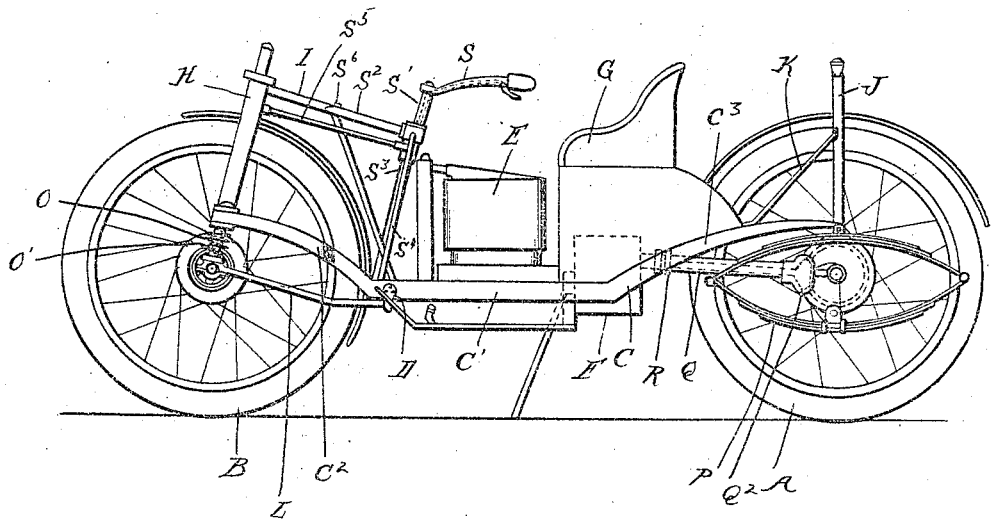
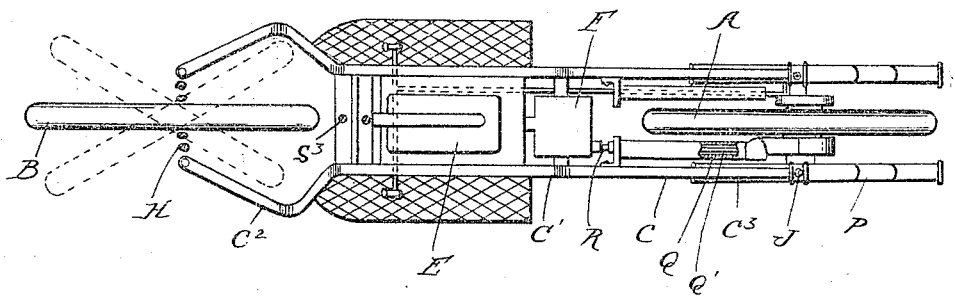
Inventor
John J. Chapin

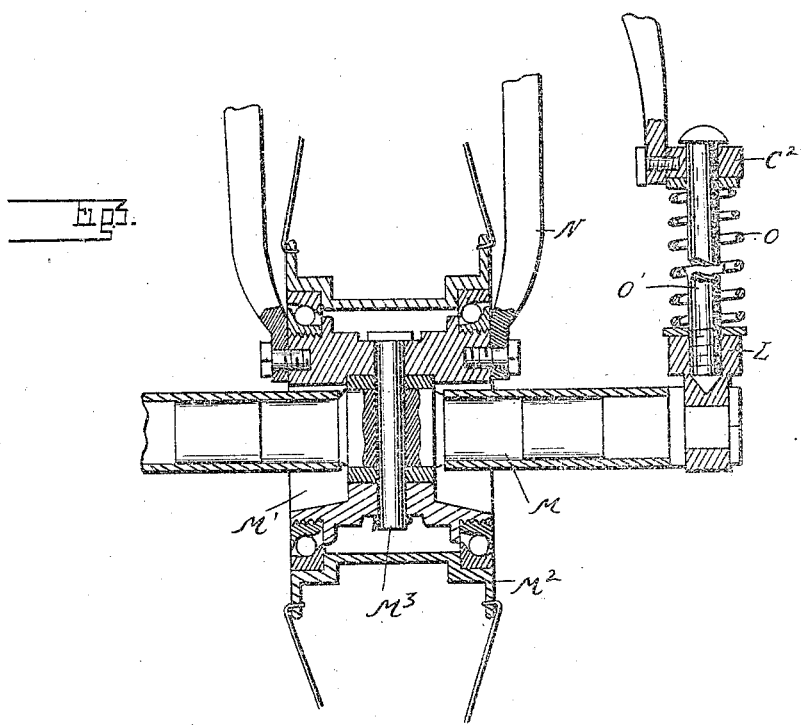

UNITED STATES PATENT OFFICE.

JOHN J. CHAPIN, OF ROCHESTER, NEW YORK, ASSIGNOR TO STEPHEN A. GRIGGS, OF WALKERVILLE, ONTARIO, CANADA.

STEERING MECHANISM FOR MOTOR-CYCLES.

1,184,321.

Specification of Letters Patent.

Patented May 23, 1916.

Application filed August 23, 1915. Serial No. 46,874.

*To all whom it may concern:*

Be it known that I, JOHN J. CHAPIN, a citizen of the United States of America, residing at Rochester, in the county of Monroe and State of New York, have invented certain new and useful Improvements in Steering Mechanism for Motor-Cycles, of which the following is a specification, reference being had therein to the accompanying drawings.

The invention relates to motor-cycles, and has more particular reference to the construction of the frame and the means for resiliently supporting the same upon the driving and steering wheels.

The invention further relates to various features of construction as more fully hereinafter set forth and claimed.

In the drawings: Figure 1 is a side elevation of the machine; Fig. 2 is a plan view thereof; Fig. 3 is a cross-section in the plane of one of the axles.

A is the driving wheel and B the steering wheel arranged in the usual tandem relation.

C is a frame resiliently supported upon said wheels through the medium of suitable springs, but held in such relation as to neither interfere with the driving or steering mechanism. Specifically, the frame C preferably comprises a pair of substantially parallel side sills C', having a central horizontal portion connected by cross sills D, and upon which is mounted the engine E, transmission gearing F, seat G, as well as other parts of the mechanism. At opposite ends of this central portion of the frame are upwardly-bent end portions $C^2$ and $C^3$, which respectively embrace the forward and rear wheels.

The forward portions $C^2$ of the frame, as shown in plan view, are laterally deflected to provide clearance for the turning of the steering wheel and beyond the point of deflection converge. At their ends they are connected to a yoke frame H which passes over the wheel, providing sufficient clearance for vertical oscillation thereof. The upper end of the yoke frame is braced by a rod I which extends rearward and downward in an inclined direction to the cross bar D, to which latter it is attached, preferably by a threaded shank passing through an aperture in the cross-bar. At the rear end of the frame C is a similar yoke J, passing over the rear wheel and braced by a pair of rods K extending to the opposite side sills.

To permit of vertical oscillation of the wheels and at the same time to hold them in the central plane of the frame, each wheel is mounted in a fork, which at its lower end is connected to the frame by radius rods, and at its upper end has a slidable bearing in the yoke. The radius rods L for the forward or steering wheel are connected to a stationary axle M, which passes through a hollow journal bearing M', for the hollow hub $M^2$, and is pivoted to the former by a vertical pin $M^3$. The fork N for this forward wheel is secured to opposite ends of the bearing M', and by reason of the clearance provided by said hollow bearing, the fork and wheel are permitted to turn for steering. As has been stated, the frame members $C^2$ are laterally deflected to provide clearance for the wheel and the radius rods L are similarly bent. Thus the wheel, while free to be turned by the steering mechanism, is nevertheless strongly connected to the frame, and also is free to oscillate vertically.

The frame is resiliently supported on both of the wheels. This is accomplished by springs O for the forward wheel, which are sleeved upon vertical studs O' connected to the radius rods L, and which pass through slotted bearings in the ends of the frame member $C^2$. The rear wheel is supported upon springs P, preferably of full elliptic form, the upper member being attached to the portion $C^3$ of the frame. The lower members of these springs are attached to radius rods Q, one of which forms a housing for the drive shaft Q' and the bevel gearing $Q^2$ for driving the rear wheel. The shaft Q', after passing out through the end of the radius rod, is coupled by a universal coupling R with a shaft extending into the housing for the transmission gearing, and this coupling R is in transverse alinement with the pivotal point of the radius rod Q, so that the oscillation of the wheel will not interfere with the driving thereof.

For steering the forward wheel, a handle-bar S is suitably mounted on the frame and connected to the fork N. I preferably arrange the steering stem S' in rear of the forward wheel and mount it in a detachable frame $S^2$, which is secured to the brace rod I. The lower end of the stem S' is stepped in a bearing S², from which it may be vertically disengaged when the frame S² is detached.

S⁴ are laterally and downwardly inclined brace rods for connecting the frame S² with the side sills C and holding the steering stem in position.

S⁵ is a rod or other operating connection between the steering stem and the fork N for transmitting an angular movement of one to the other. Thus by detaching the frame S², which is secured by a bolt S⁶, and by also detaching the lower ends of the brace rods S⁴ and the rod S⁵, the steering stem and handle-bar may be removed.

What I claim as my invention is:

1. In a motorcycle, a rigid frame, a supporting wheel, resilient vertically-yieldable connections between said frame and wheel, and steering means mounted on said frame operatively connected with said wheel in the various positions assumed thereby during its vertical and steering movements.

2. In a motorcycle, a rigid frame provided with side sills extending between centers of the forward and rear wheels, the forward portion thereof providing clearance for the turning of the wheel, a vertically-yieldable resilient support for said frame on the steering wheel, a radius rod for connecting said wheel to said frame, also providing clearance for the turning of the wheel, a fork for said wheel, and a steering mechanism mounted on said frame connected to the fork and operative in different positions of movement thereof relative to the frame.

3. In a motorcycle, a steering wheel, a frame having forwardly-extending side sills embracing said steering wheel and laterally deflected to provide clearance therefor, a vertically-yieldable resilient connection between said frame and wheel, and a radius rod connecting said wheel with said frame and also providing clearance for turning.

4. In a motorcycle, a steering wheel, a fork for turning said wheel, a frame having forwardly-extending side sills embracing said wheel and a portion vertically, adjustably engaging said fork, a radius rod connecting said wheel to said frame, and a resilient support intermediate said radius rod and the forward-projecting portion of said sills.

5. In a motorcycle, a steering wheel, a stationary axle for said wheel, a journal for said wheel vertically, pivotally connected to said stationary axle, a frame having forwardly-extending sills embracing said wheel and providing clearance for the turning thereof, a radius rod connected to said stationary axle and pivotally connected to said frame, a resilient, yieldable support for said forwardly-projecting sills of said frame upon said stationary axle, and steering mechanism for turning said wheel.

6. In a motorcycle, the combination with a wheel of a hollow hub therefor, a hollow journal within said hub, a stationary axle within said hollow journal and pivotally connected thereto, a frame having forwardly-projecting side sills embracing said wheel and laterally deflected to provide clearance for the turning thereof, radius rods pivotally connected to said frame and secured to said stationary axle, said rods being similarly laterally deflected to provide clearance for the turning of the wheel, and resilient, vertically-yieldable connections between said frame and radius rods.

7. In a motorcycle, the combination with the steering wheel, of a frame having forwardly-projecting side sills embracing said wheel and laterally deflected to provide clearance for the turning thereof, and radius rods connected with said wheel and pivotally connected to said frame, correspondingly, laterally deflected to provide clearance for turning.

8. In a motorcycle, the combination with a steering wheel, of a frame having forwardly-extending side sills embracing said wheel and laterally deflected to provide clearance for the turning thereof, a radius rod connected to said wheel and pivotally connected to said frame, and a resilient, yieldable connection between said side sills and radius rod.

9. In a motorcycle, the combination with the steering wheel, of a frame having forwardly-extending side sills embracing said wheel and laterally deflected to provide clearance for the turning thereof, a yoke connecting the ends of said side sills and extending over said wheel, a fork for turning said wheel within said yoke, pivotally and vertically adjustably engaging the same, a hollow hub for said wheel, a hollow journal within said hub connected to said fork, an axle within said hollow journal and pivotally connected thereto, radius rods connecting said axle with said frame, and resilient, yieldable connections between said radius rods and the ends of the side sills of said frame.

10. In a motorcycle, a frame having forwardly-extending side sills embracing the steering wheel and laterally deflected to provide clearance for the turning of said wheel, and a radius rod connecting said wheel to said frame, correspondingly laterally deflected.

11. In a motorcycle, a frame comprising a horizontal portion, side sills extending forward of said horizontal portion to embrace the steering wheel, being upwardly-inclined and laterally-deflected to provide clearance for the vertical and lateral movement of said wheel, and a foot board extending along the horizontal portion of said frame, with its forward end terminating in the laterally deflected portion of the side sill.

12. In a motorcycle, the combination with a wheel of a frame, having separated side sills embracing said wheel and inclining upward to above the center thereof, a yoke connected to the ends of said side sills and passing over the wheel, inclined braces between said yoke and said side sills, and a resilient, yieldable supporting connection between said wheel and said side sills.

13. In a motorcycle, the combination with the steering wheel, of a frame having forwardly-projecting side sills embracing said wheel, radius rods connecting said wheel and frame, studs upon said radius rods slidably engaging said sills and springs sleeved upon said studs and extending between said rods and sills.

In testimony whereof I affix my signature in presence of two witnesses.

JOHN J. CHAPIN.

Witnesses:
CHARLES G. TIEFEL,
EDWARD H. CUMPSTON, Jr.